(12) United States Patent
Lee et al.

(10) Patent No.: US 12,120,702 B2
(45) Date of Patent: Oct. 15, 2024

(54) SIDELINK RESOURCE ALLOCATION AND MAC RESET

(71) Applicant: LG Electronics Inc., Seoul (KR)

(72) Inventors: Youngdae Lee, Seoul (KR); Giwon Park, Seoul (KR); Jongyoul Lee, Seoul (KR)

(73) Assignee: LG Electronics Inc., Seoul (KR)

(*) Notice: Subject to any disclaimer, the term of this patent is extended or adjusted under 35 U.S.C. 154(b) by 90 days.

(21) Appl. No.: 17/799,841

(22) PCT Filed: Apr. 9, 2021

(86) PCT No.: PCT/KR2021/004474
§ 371 (c)(1),
(2) Date: Aug. 15, 2022

(87) PCT Pub. No.: WO2021/206497
PCT Pub. Date: Oct. 14, 2021

(65) Prior Publication Data
US 2023/0085465 A1    Mar. 16, 2023

(30) Foreign Application Priority Data

Apr. 9, 2020 (KR) ........................ 10-2020-0043623

(51) Int. Cl.
*H04L 12/28*     (2006.01)
*H04L 1/1829*    (2023.01)
(Continued)

(52) U.S. Cl.
CPC ........... *H04W 72/23* (2023.01); *H04L 1/1864* (2013.01); *H04W 72/0453* (2013.01)

(58) Field of Classification Search
CPC ...... H04L 1/1812; H04W 72/04; H04W 72/40
(Continued)

(56) References Cited

U.S. PATENT DOCUMENTS 11,737,055 B2 * 8/2023 Shin .................... H04W 72/535
370/330
2020/0351855 A1   11/2020 Kung et al.
(Continued)

FOREIGN PATENT DOCUMENTS

WO   WO2019066558   4/2019
WO   WO2020033088   2/2020
WO   WO2020068991   4/2020

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 16)," TS 36.321 V16.0.0, Mar. 2020, 141 pages.
3GPP, "3rd Generation Partnership Project; Technical Specification Group Radio Access Network; NR; Medium Access Control (MAC) protocol specification (Release 15)," TS 38.321 V15.8.0, Dec. 2019, 78 pages.

(Continued)

*Primary Examiner* — John Pezzlo
(74) *Attorney, Agent, or Firm* — Fish & Richardson P.C.

(57) ABSTRACT

A method and apparatus for sidelink resource allocation and media access control (MAC) reset is provided. A wireless device, which is configured with network scheduled resource allocation for sidelink, sets new data indicators (NDIs) for all hybrid automatic repeat request (HARQ) process identifiers (IDs) specific to the sidelink to value 0, based on a media access control (MAC) reset being requested by an upper layer of the wireless device.

15 Claims, 13 Drawing Sheets

(51) Int. Cl.
*H04W 72/0453* (2023.01)
*H04W 72/23* (2023.01)
*H04J 1/16* (2006.01)

(58) Field of Classification Search
USPC ........................................ 370/252, 278, 329
See application file for complete search history.

(56) References Cited

U.S. PATENT DOCUMENTS

| | | | |
|---|---|---|---|
| 2021/0045178 A1 | 2/2021 | Kung et al. | |
| 2021/0136742 A1 | 5/2021 | Huang et al. | |
| 2021/0168790 A1 | 6/2021 | Li et al. | |
| 2022/0346011 A1* | 10/2022 | Hong | H04W 52/02 |
| 2022/0394810 A1* | 12/2022 | Hong | H04L 1/1883 |
| 2022/0417976 A1* | 12/2022 | Park | H04L 5/0078 |

OTHER PUBLICATIONS

LG Electronics Inc., "Introduction of 5G V2X with NR Sidelink," R2-2002316, Presented at 3GPP TSG-RAN WG2 Meeting #109-e, Online, Feb. 24-Mar. 6, 2020, 36 pages.

Office Action in U.S. Appl. No. 18/117,816, mailed on May 26, 2023, 9 pages.

Notice of Allowance in U.S. Appl. No. 18/117,816, mailed on Sep. 1, 2023, 12 pages.

Office Action in Korean Appln. No. 10-2022-7039024, mailed on Aug. 3, 2023, 10 pages (with English translation).

LG Electronics Inc., "[Running CR] Introduction of 5G V2X with NR Sidelink," R2- 1916120, 3GPP TSG-RAN WG2, Meeting #108, Reno, USA, Nov. 18-22, 2019, 38 pages.

Notice of Allowance in Korean Appln. No. 10-2022-7039024, mailed on May 7, 2024, 5 pages (with English translation).

* cited by examiner

SIDELINK RESOURCE ALLOCATION AND MAC RESET

CROSS-REFERENCE TO RELATED APPLICATIONS

This application is a National Stage application under 35 U.S.C. § 371 of International Application No. PCT/KR2021/004474, filed on Apr. 9, 2021, which claims the benefit of Korean Patent Application No. 10-2020-0043623, filed on Apr. 9, 2020. The disclosures of the prior applications are incorporated by reference in their entirety.

TECHNICAL FIELD

The present disclosure relates to sidelink resource allocation and media access control (MAC) reset.

BACKGROUND

Wireless communication systems generally aim to reduce costs for users and providers, improve service quality, and expand and improve coverage and system capacity. To achieve these goals, in some scenarios, wireless communication systems are designed to reduced cost per bit, increased service availability, flexible use of a frequency band, a simple structure, an open interface, and adequate power consumption of a terminal as an upper-level requirement.

SUMMARY

An aspect of the present disclosure is to provide a method and apparatus for setting a new data indicator (NDI) based on a media access control (MAC) reset for connection between a wireless device and a network.

Another aspect of the present disclosure is to provide a method and apparatus for performing sidelink transmission scheduled by a physical downlink control channel (PDCCH) indicating a NDI.

In an aspect, a method performed by a wireless device operating in a wireless communication system is provided. The method includes receiving, from the base station, a configuration of network scheduled resource allocation for sidelink, and based on a media access control (MAC) reset being requested by an upper layer of the wireless device, setting new data indicators (NDIs) for all hybrid automatic repeat request (HARQ) process identifiers (IDs) specific to sidelink to value 0.

In another aspect, a method performed by a network node operating in a wireless communication system is provided. The method includes transmitting, to the wireless device, a configuration of network scheduled resource allocation for sidelink, and transmitting, to the wireless device via a physical downlink control channel (PDCCH), downlink control information including 1) resource allocation information for the sidelink, 2) a hybrid automatic repeat request (HARQ) process ID specific to the sidelink, and 3) a new data indicator (NDI) for the HARQ process ID. NDIs for all HARQ process IDs specific to the sidelink are set to value 0 based on MAC reset being requested by an upper layer of the wireless device.

In another aspect, apparatuses for implementing the above methods are provided.

The present disclosure can have various advantageous effects.

For example, in case of Uu MAC reset, NDI can be reset only for the HARQ process ID indicated by PDCCH. Therefore, after Uu MAC reset, if the base station transmits DCI including NDI set to 1, the UE can optionally stop transmission of the existing TB and select sidelink process in which newly created TB is to be transmitted.

For example, a UE performing SL transmission can properly reset MAC, in particular when UE detects link failure on Uu interface or PC5 interface.

For example, the system can properly handle MAC reset for a UE performing SL transmission.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
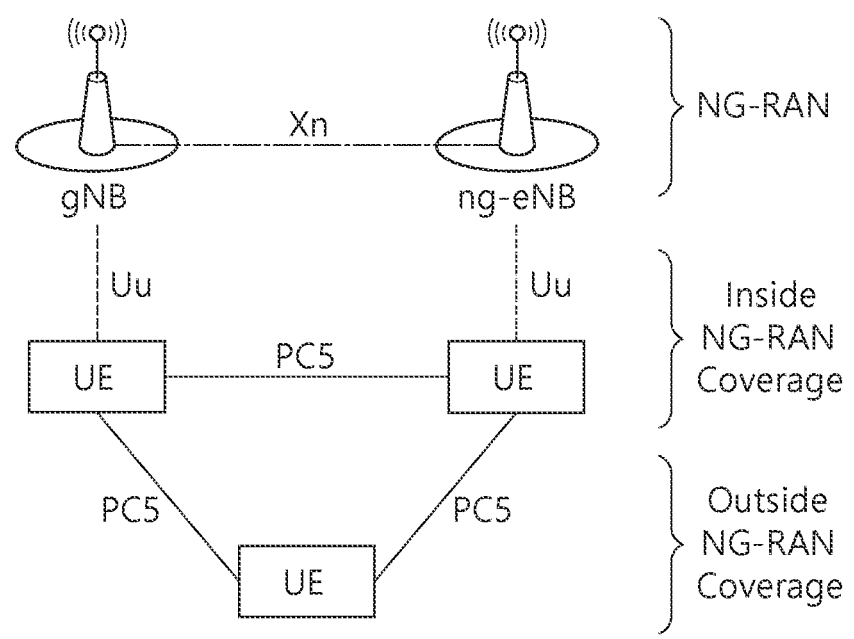
FIG. 1 shows an example of NG-RAN architecture supporting PC5 interface to which implementations of the present disclosure is applied.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Vehicle-to-everything (V2X) communication is the communication of information from a vehicle to an entity that may affect the vehicle, and vice versa. Examples of V2X include vehicle-to-infrastructure (V2I), vehicle-to-network (V2N), vehicle-to-vehicle (V2V), vehicle-to-pedestrian (V2P), vehicle-to-device (V2D), and vehicle-to-grid (V2G).

V2X systems may be designed to achieve various objectives, such as road safety, traffic efficiency, and energy savings. V2X communication technology may be classified into two types, depending on the underlying technology: wireless local area network (WLAN)-based V2X, and cellular-based V2X.

The 3rd generation partnership project (3GPP) long-term evolution (LTE) is a technology designed to enable high-speed packet communications. In addition, the international telecommunication union (ITU) and 3GPP have developed technical standards for new radio (NR) systems. In doing so, technology is being identified and developed to successfully standardize the new radio access technology (RAT), in order to timely satisfy both urgent market needs, as well as longer-term goals and requirements set forth by the ITU radio communication sector (ITU-R) international mobile telecommunications (IMT)-2020 process. In some scenarios, NR is being designed to use any spectrum band ranging at least up to 100 GHz, which may be made available for wireless communications even in a more distant future.

The NR targets a technical framework addressing various usage scenarios, requirements, and deployment scenarios, such as, for example, enhanced mobile broadband (eMBB), massive machine-type-communications (mMTC), ultra-reliable and low latency communications (URLLC), etc.

In some systems, one or more technical features described below may be compatible with one or more technical standards, such as those used by a communication standard by the 3GPP standardization organization, a communication standard by the institute of electrical and electronics engineers (IEEE), etc. For example, the communication standards by the 3GPP standardization organization include LTE and/or evolution of LTE systems. The evolution of LTE systems includes LTE-advanced (LTE-A), LTE-A Pro, and/or 5G NR. The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of NG-RAN architecture supporting PC5 interface to which implementations of the present disclosure is applied.

Referring to FIG. 1, sidelink transmission and reception over the PC5 interface are supported when the UE is inside NG-RAN coverage, irrespective of which RRC state the UE is in, and when the UE is outside NG-RAN coverage.

Support of V2X services via the PC5 interface can be provided by NR sidelink communication and/or V2X sidelink communication. NR sidelink communication may be used to support other services than V2X services.

NR sidelink communication can support one of three types of transmission modes for a pair of a Source Layer-2 ID and a Destination Layer-2 ID in the AS:

(1) Unicast transmission, characterized by:
 Support of one PC5-RRC connection between peer UEs for the pair;
 Transmission and reception of control information and user traffic between peer UEs in sidelink;
 Support of sidelink HARQ feedback;
 Support of RLC AM;
 Detection of radio link failure for the PC5-RRC connection.
(2) Groupcast transmission, characterized by:
 Transmission and reception of user traffic among UEs belonging to a group in sidelink;
 Support of sidelink HARQ feedback.
(3) Broadcast transmission, characterized by:
 Transmission and reception of user traffic among UEs in sidelink.

Two sidelink resource allocation modes are supported, i.e., mode 1 and mode 2. In mode 1, the sidelink resource allocation is provided by the network. In mode 2, UE decides the SL transmission resources and timing in the resource pool.

Mode 1, which may be called scheduled resource allocation, may be characterized by the following:
  The UE needs to be RRC_CONNECTED in order to transmit data;
  NG-RAN schedules transmission resources.

Mode 2, which may be called UE autonomous resource selection, may be characterized by the following:
  The UE can transmit data when inside NG-RAN coverage, irrespective of which RRC state the UE is in, and when outside NG-RAN coverage;
  The UE autonomously selects transmission resources from a pool of resources.

For NR sidelink communication, the UE performs sidelink transmissions only on a single carrier.

In mode 1, NG-RAN can dynamically allocate resources to the UE via the sidelink radio network temporary identifier (SL-RNTI) on PDCCH(s) for NR sidelink communication.

In addition, NG-RAN can allocate sidelink resources to UE with two types of configured sidelink grants:
  With type 1, RRC directly provides the configured sidelink grant only for NR sidelink communication;
  With type 2, RRC defines the periodicity of the configured sidelink grant while PDCCH can either signal and activate the configured sidelink grant, or deactivate it. The PDCCH is addressed to SL configured scheduling RNTI (SL-CS-RNTI) for NR sidelink communication and SL semi-persistent scheduling V-RNTI for V2X sidelink communication.

For the UE performing NR sidelink communication, there can be more than one configured sidelink grant activated at a time on the carrier configured for sidelink transmission When beam failure or physical layer problem occurs on NR Uu, the UE can continue using the configured sidelink grant type 1. During handover, the UE can be provided with configured sidelink grants via handover command, regardless of the type. If provided, the UE activates the configured sidelink grant type 1 upon reception of the handover command.

The UE can send sidelink buffer status report (SL BSR) to support scheduler operation in NG-RAN. The sidelink buffer status reports refer to the data that is buffered in for a group of logical channels (LCG) per destination in the UE. Eight LCGs are used for reporting of the sidelink buffer status reports. Two formats, which are SL BSR and truncated SL BSR, are used.

In mode 2, the UE autonomously selects sidelink grant from a pool of resources provided by broadcast system information or dedicated signalling while inside NG-RAN coverage or by pre-configuration while outside NG-RAN coverage.

For NR sidelink communication, the pools of resources can be provided for a given validity area where the UE does not need to acquire a new pool of resources while moving within the validity area, at least when this pool is provided by system information block (SIB) (e.g. reuse valid area of NR SIB). NR SIB validity mechanism is reused to enable validity area for SL resource pool configured via broadcasted system information.

The UE is allowed to temporarily use UE autonomous resource selection with random selection for sidelink transmission based on configuration of the exceptional transmission resource pool.

When a UE is inside NG-RAN coverage. NR sidelink communication and/or V2X sidelink communication can be configured and controlled by NG-RAN via dedicated signalling or system information:
  The UE should support and be authorized to perform NR sidelink communication and/or V2X sidelink communication in NG-RAN;
  If configured, the UE performs V2X sidelink communication unless otherwise specified;
  NG-RAN can provide the UE with intra-carrier sidelink configuration, inter-carrier sidelink configuration and anchor carrier which provides sidelink configuration via a Uu carrier for NR sidelink communication and/or V2X Sidelink communication;
  When the UE cannot simultaneously perform both NR sidelink transmission and NR uplink transmission in time domain, prioritization between both transmissions is done based on their priorities and thresholds configured by the NG-RAN.

When a UE is outside NG-RAN coverage, SLRB configuration are preconfigured to the UE for NR sidelink communication.

The UE in RRC_CONNECTED performs NR sidelink communication and/or V2X sidelink communication. The UE sends Sidelink UE Information to NG-RAN in order to request or release sidelink resources and report QoS information for each destination.

NG-RAN provides RRCReconfiguration to the UE in order to provide the UE with dedicated sidelink configuration. The RRCReconfiguration may include SLRB configuration for NR sidelink communication as well as either sidelink scheduling configuration or resource pool configuration. If UE has received SLRB configuration via system information, UE should continue using the configuration to perform sidelink data transmissions and receptions until a new configuration is received via the RRCReconfiguration.

NG-RAN may also configure measurement and reporting of channel busy ratio (CBR) and reporting of location information to the UE via RRCReconfiguration.

During handover, the UE performs sidelink transmission and reception based on configuration of the exceptional transmission resource pool or configured sidelink grant type 1 and reception resource pool of the target cell as provided in the handover command.

The UE in RRC_IDLE or RRC_INACTIVE performs NR sidelink communication and/or V2X sidelink communication. NG-RAN may provide common sidelink configuration to the UE in RRC_IDLE or RRC_INACTIVE via system information for NR sidelink communication and/or V2X sidelink communication. UE receives resource pool configuration and SLRB configuration via SIB12 for NR sidelink communication, and/or resource pool configuration via SIB13 and SIB14 for V2X sidelink communication. If UE has received SLRB configuration via dedicated signalling, UE should continue using the configuration to perform sidelink data transmissions and receptions until a new configuration is received via system information.

When the UE performs cell reselection, the UE interested in V2X service(s) considers at least whether NR sidelink communication and/or V2X sidelink communication are supported by the cell. The UE may consider the following carrier frequency as the highest priority frequency, except for the carrier only providing the anchor carrier:
  the frequency providing both NR sidelink communication and V2X sidelink communication, if configured to perform both NR sidelink communication and V2X sidelink communication;

the frequency providing NR sidelink communication, if configured to perform only NR sidelink communication.

Radio protocol architecture for NR sidelink communication may be as follows.

The AS protocol stack for the control plane in the PC5 interface consists of RRC, PDCP, RLC and MAC sublayers, and the physical layer.

For support of PC5-S protocol, PC5-S is located on top of PDCP, RLC and MAC sublayers, and the physical layer for the control plane in the PC5 interface.

The AS protocol stack for SBCCH in the PC5 interface consists of RRC, RLC, MAC sublayers, and the physical layer.

The AS protocol stack for user plane in the PC5 interface consists of SDAP, PDCP. RLC and MAC sublayers, and the physical layer.

Sidelink Radio bearers (SLRB) are categorized into two groups: sidelink data radio bearers (SL DRB) for user plane data and sidelink signalling radio bearers (SL SRB) for control plane data. Separate SL SRBs using different SCCHs are configured for PC5-RRC and PC5-S signaling respectively.

Physical sidelink control channel (PSCCH) indicates resource and other transmission parameters used by a UE for PSSCH. PSCCH transmission is associated with a demodulation reference signal (DM-RS).

Physical sidelink shared channel (PSSCH) transmits the TBs of data themselves, and control information for HARQ procedures and channel state information (CSI) feedback triggers, etc. At least 5 OFDM symbols within a slot are used for PSSCH transmission. PSSCH transmission is associated with a DM-RS and may be associated with a phase tracking reference signal (PT-RS).

Physical sidelink feedback channel (PSFCH) carries HARQ feedback over the sidelink from a UE which is an intended recipient of a PSSCH transmission to the UE which performed the transmission. PSFCH sequence is transmitted in one PRB repeated over two OFDM symbols near the end of the sidelink resource in a slot.

The sidelink synchronization signal consists of sidelink primary and sidelink secondary synchronization signals (S-PSS, S-SSS), each occupying 2 symbols and 127 subcarriers. Physical sidelink broadcast channel (PSBCH) occupies 7 and 5 symbols for normal and extended cyclic prefix cases respectively, including the associated DM-RS.

Sidelink HARQ feedback uses PSFCH and can be operated in one of two options. In one option, PSFCH transmits either acknowledgement (ACK) or negative ACK (NACK) using a resource dedicated to a single PSFCH transmitting UE. In another option, PSFCH transmits NACK, or no PSFCH signal is transmitted, on a resource that can be shared by multiple PSFCH transmitting UEs.

In sidelink resource allocation mode 1, a UE which received PSFCH can report sidelink HARQ feedback to gNB via PUCCH or PUSCH.

For unicast, CSI reference signal (CSI-RS) is supported for CSI measurement and reporting in sidelink. A CSI report is carried in a MAC control element (CE).

The MAC sublayer provides the following services and functions over the PC5 interface.
  Radio resource selection;
  Packet filtering;
  Priority handling between uplink and sidelink transmissions for a given UE;
  Sidelink CSI reporting.

With logical channel prioritization (LCP) restrictions in MAC, only sidelink logical channels belonging to the same destination can be multiplexed into a MAC PDU for every unicast, groupcast and broadcast transmission which is associated to the destination. NG-RAN can also control whether a sidelink logical channel can utilize the resources allocated to a configured sidelink grant type 1.

For packet filtering, a SL-SCH MAC header including portions of both Source Layer-2 ID and a Destination Layer-2 ID is added to each MAC PDU. Logical channel ID (LCID) included within a MAC subheader uniquely identifies a logical channel within the scope of the Source Layer-2 ID and Destination Layer-2 ID combination.

The following logical channels are used in sidelink:
  Sidelink control channel (SCCH): a sidelink channel for transmitting control information from one UE to other UE(s);
  Sidelink traffic channel (STCH): a sidelink channel for transmitting user information from one UE to other UE(s);
  Sidelink broadcast control channel (SBCCH): a sidelink channel for broadcasting sidelink system information from one UE to other UE(s).

The following connections between logical channels and transport channels exist:
  SCCH can be mapped to sidelink shared channel (SL-SCH);
  STCH can be mapped to SL-SCH;
  SBCCH can be mapped to sidelink broadcast channel (SL-BCH).

The RRC sublayer provides the following services and functions over the PC5 interface:
  Transfer of a PC5-RRC message between peer UEs;
  Maintenance and release of a PC5-RRC connection between two UEs;
  Detection of sidelink radio link failure for a PC5-RRC connection.

A PC5-RRC connection is a logical connection between two UEs for a pair of Source and Destination Laver-2 IDs which is considered to be established after a corresponding PC5 unicast link is established. There is one-to-one correspondence between the PC5-RRC connection and the PC5 unicast link. A UE may have multiple PC5-RRC connections with one or more UEs for different pairs of Source and Destination Layer-2 IDs.

Separate PC5-RRC procedures and messages are used for a UE to transfer UE capability and sidelink configuration including SLRB configuration to the peer UE. Both peer UEs can exchange their own UE capability and sidelink configuration using separate bi-directional procedures in both sidelink directions.

If it is not interested in sidelink transmission, if sidelink radio link failure (RLF) on the PC5-RRC connection is declared, or if the Layer-2 link release procedure is completed or if the T400 is expired, UE releases the PC5-RRC connection.

Figure 2:
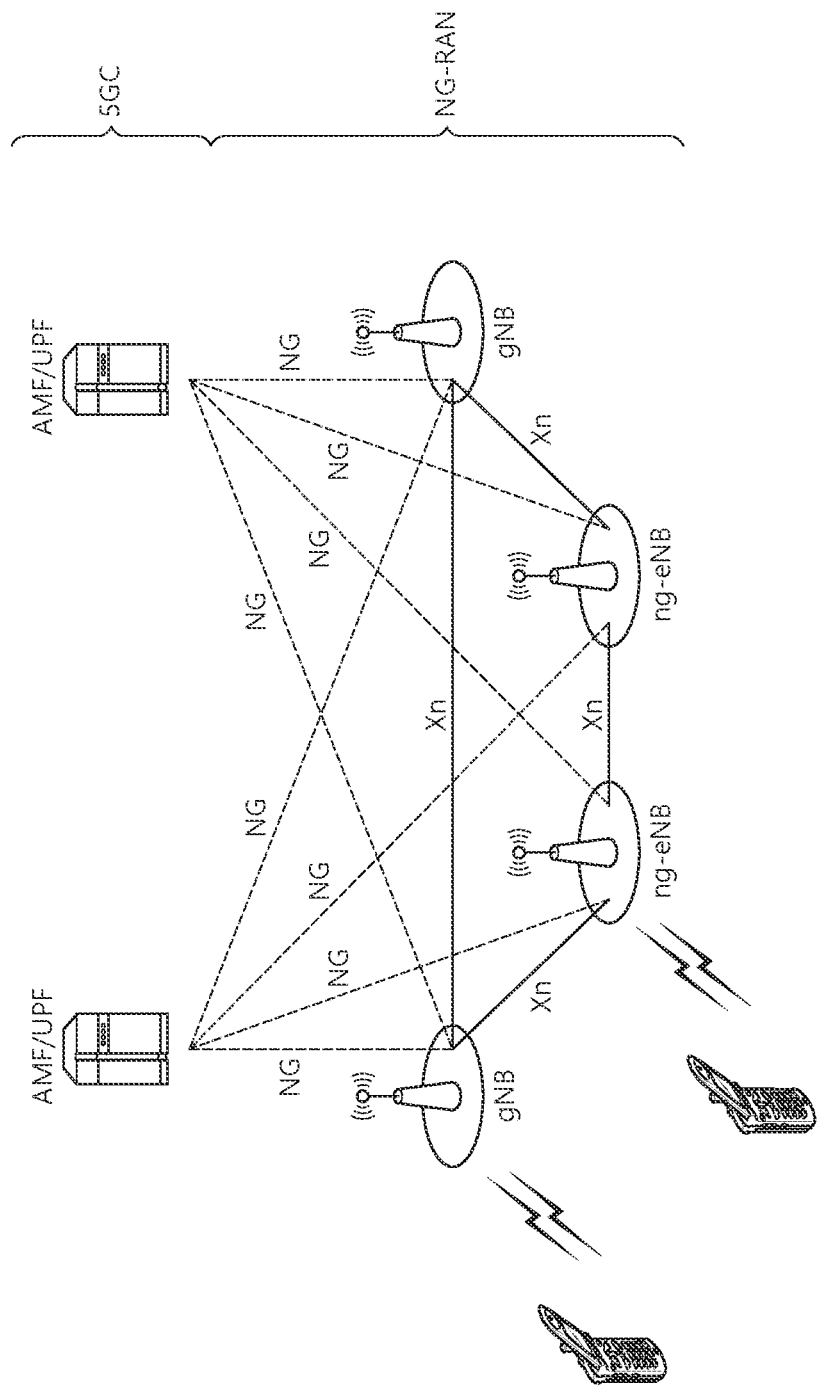
FIG. 2 shows an example of a wireless communication system to which implementations of the present disclosure can be applied.

FIG. 2 shows an example of a wireless communication system to which implementations of the present disclosure can be applied.

Referring to FIG. 2, the wireless communication system includes one or more user equipment (UE), a next-generation RAN (NG-RAN) and a 5th generation core network (5GC). The NG-RAN consists of at least one NG-RAN node. The NG-RAN node consists of at least one gNB and/or at least one ng-eNB. The gNB provides NR user plane and control plane protocol terminations towards the UE. The ng-eNB provides E-UTRA user plane and control plane protocol terminations towards the UE.

The 5GC includes an access and mobility management function (AMF), a user plane function (UPF) and a session management function (SMF). The AMF hosts various functions, such as, for example, non-access stratum (NAS) security, idle state mobility handling, evolved packet system (EPS) bearer control, etc. The UPF hosts various functions, such as, for example, mobility anchoring, protocol data unit (PDU) handling, etc. The SMF hosts various functions, such as, for example, UE IP address allocation, PDU session control, etc.

The gNBs and ng-eNBs are interconnected with each other by an interface, such as the Xn interface. The gNBs and ng-eNBs are also connected by NG interfaces to the 5GC, for example, to the AMF by the NG-C interface and to the UPF by the NG-U interface.

An example of a protocol structure between network entities described above is described. In the example of FIG. 2, layers of a radio interface protocol between the UE and the network (e.g. NG-RAN) may be classified into a first layer (L1), a second layer (L2), and a third layer (L3), for example based on the lower three layers of the open system interconnection (OSI) model.

Figure 3:
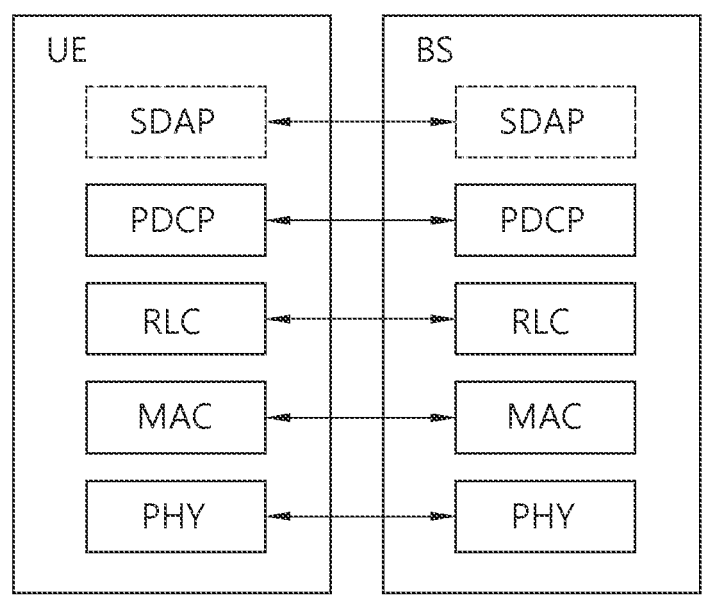
FIG. 3 shows a block diagram of an example of a user plane protocol stack to which implementations of the present disclosure can be applied.
Figure 4:
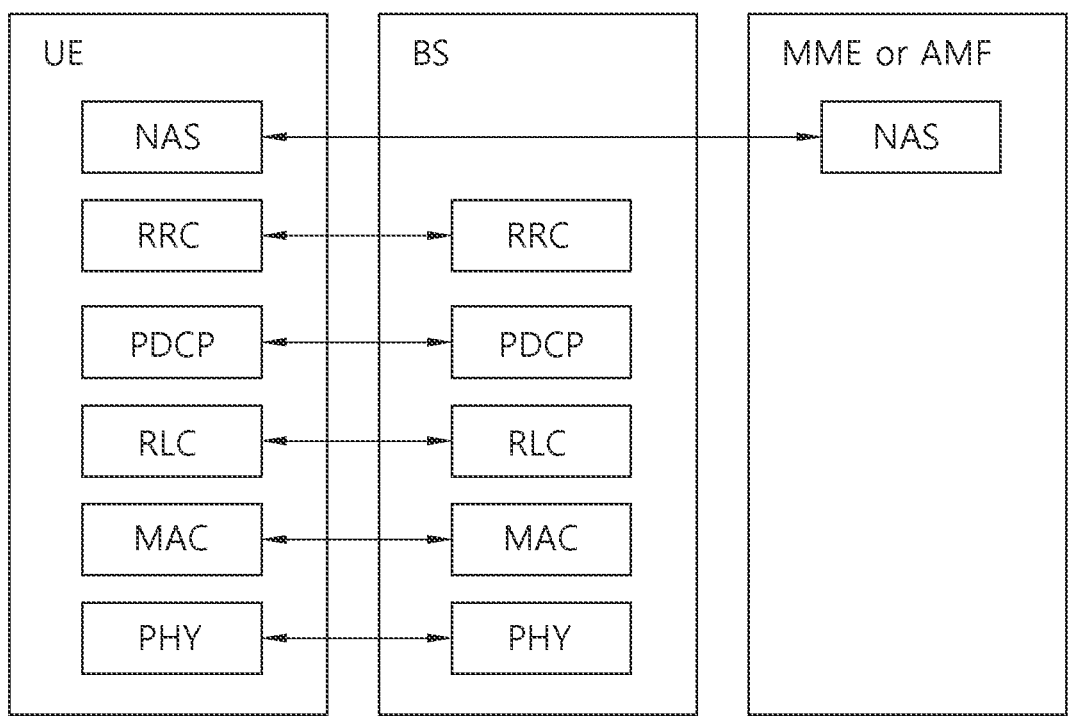
FIG. 4 shows a block diagram of an example of a control plane protocol stack to which implementations of the present disclosure can be applied.

FIG. 3 shows a block diagram of an example of a user plane protocol stack to which implementations of the present disclosure can be applied. FIG. 4 shows a block diagram of an example of a control plane protocol stack to which implementations of the present disclosure can be applied.

Referring to the examples of FIG. 3 and FIG. 4, a physical (PHY) layer belongs to L1. The PHY layer offers information transfer services to the media access control (MAC) sublayer and higher layers. For example, the PHY layer offers transport channels to the MAC sublayer, and data between the MAC sublayer and the PHY layer is transferred via the transport channels. Between different PHY layers, e.g., between a PHY layer of a transmission side and a PHY layer of a reception side, data is transferred via physical channels.

The MAC sublayer belongs to L2. The services and functions of the MAC sublayer include, for example, mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by dynamic scheduling, priority handling between logical channels of one UE by logical channel prioritization (LCP), etc. The MAC sublayer offers to the radio link control (RLC) sublayer logical channels.

The RLC sublayer belong to L2. In some implementations, the RLC sublayer supports different transmission modes, e.g., transparent mode (TM), unacknowledged mode (UM), and acknowledged mode (AM). The different transmission modes may help guarantee various quality of services (QoS) required by radio bearers. The services and functions of the RLC sublayer may depend on the transmission mode. For example, in some implementations, the RLC sublayer provides transfer of upper layer PDUs for all three modes, but provides error correction through ARQ for AM only. In some implementations, such as implementations compatible with LTELTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). In some implementations, the NR does not support concatenation of RLC SDUs. The RLC sublayer offers RLC channels to the packet data convergence protocol (PDCP) sublayer.

The PDCP sublayer belongs to L2. The services and functions of the PDCP sublayer for the user plane include, for example, header compression and decompression, transfer of user data, duplicate detection. PDCP PDU routing, retransmission of PDCP SDUs, ciphering and deciphering, etc. The services and functions of the PDCP sublayer for the control plane include, for example, ciphering and integrity protection, transfer of control plane data, etc.

The service data adaptation protocol (SDAP) sublayer belongs to L2. In some implementations, the SDAP sublayer is only defined in the user plane. The services and functions of SDAP include, for example, mapping between a QoS flow and a data radio bearer (DRB), and marking QoS flow ID (QFI) in both DL and UL packets. The SDAP sublayer offers QoS flows to 5GC.

A radio resource control (RRC) layer belongs to L3. In some implementations, the RRC layer is only defined in the control plane. The RRC layer controls radio resources between the UE and the network. For example, the RRC layer exchanges RRC messages between the UE and the BS. The services and functions of the RRC layer include, for example, broadcast of system information related to access stratum AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

As such, in some implementations, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. In some scenarios, setting the radio bearer may include defining the characteristics of the radio protocol layer and the channel for providing a specific service, and setting each specific parameter and operation method. Radio bearers may include signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the network. In some implementations, when the RRC connection is established between the RRC layer of the UE and the RRC layer of the network, the UE is in the RRC connected state (RRC_CONNECTED); and otherwise, the UE is in the RRC idle state (RRC_IDLE). In implementations compatible with NR, the RRC inactive state (RRC_INACTIVE) is additionally introduced. The RRC_INACTIVE state may be used for various purposes. For example, in some scenarios, massive machine-type communications (mMTC) UEs can be efficiently managed in RRC_INACTIVE. When specific conditions are satisfied, transitions can be made from one of the above three states to others.

Various operations may be performed according to the RRC state. For example, in RRC_IDLE, operations such as public land mobile network (PLMN) selection, broadcast of system information (SI), cell re-selection mobility, core network (CN) paging and discontinuous reception (DRX) configured by NAS may be performed. The UE may be allocated an identifier (ID) which uniquely identifies the UE in a tracking area. In some implementations, no RRC context is stored in the base station.

As another example, in RRC_CONNECTED, the UE has an RRC connection with the network. Network-CN connection (both C/U-planes) is also established for UE. In some implementations, the UE AS context is stored in the network and the UE. The RAN knows the cell which the UE belongs to, and the network can transmit and/or receive data to/from UE. In some implementations, network controlled mobility including measurement is also performed.

One or more operations that are performed in RRC_IDLE may also be performed in RRC_INACTIVE. However, in some implementations, instead of performing CN paging as in RRC_IDLE, RAN paging may be performed in RRC_INACTIVE. For example, in RRC_IDLE, paging for mobile terminated (MT) data is initiated by a core network and paging area is managed by the core network. In RRC_INACTIVE, paging may be initiated by NG-RAN, and RAN-based notification area (RNA) is managed by NG-RAN. Further, in some implementations, instead of DRX for CN paging configured by NAS in RRC_IDLE, DRX for RAN paging is configured by NG-RAN in RRC_INACTIVE. In some implementations, in RRC_INACTIVE, 5GC-NG-RAN connection (both C/U-planes) is established for UE, and the UE AS context is stored in NG-RAN and the UE. The NG-RAN may know the RNA which the UE belongs to.

The NAS layer is implemented above the RRC layer, as shown in the example of FIG. 4. The NAS control protocol performs various functions, such as, for example, authentication, mobility management, security control, etc.

Physical channels, for example as utilized by the PHY layer, may be modulated according to various modulation techniques utilizing time and frequency as radio resources. For example, the physical channels may consist of a plurality of orthogonal frequency division multiplexing (OFDM) symbols in time domain and a plurality of subcarriers in frequency domain. A subframe may be implemented, which consists of a plurality of OFDM symbols in the time domain. A resource block may be implemented as a resource allocation unit, and each resource block may consist of a plurality of OFDM symbols and a plurality of subcarriers. In addition, each subframe may use specific subcarriers of specific OFDM symbols (e.g., the first OFDM symbol) of the corresponding subframe for a specific purpose, such as for a physical downlink control channel (PDCCH), e.g., an L1/L2 control channel. A transmission time interval (TTI) may be implemented as a basic unit of time, for example as used by a scheduler for resource allocation. The TTI may be defined in units of one or a plurality of slots, or may be defined in units of mini-slots.

Transport channels may be classified according to how and with what characteristics data are transferred over the radio interface. For example, DL transport channels include a broadcast channel (BCH) used for transmitting system information, a downlink shared channel (DL-SCH) used for transmitting user traffic or control signals, and a paging channel (PCH) used for paging a UE. As another example, UL transport channels include an uplink shared channel (UL-SCH) for transmitting user traffic or control signals and a random access channel (RACH) normally used for initial access to a cell.

Different kinds of data transfer services may be offered by the MAC sublayer. Different logical channel types may be defined by what type of information is transferred. In some implementations, logical channels may be classified into two groups: control channels and traffic channels.

Control channels are used for the transfer of control plane information only, according to some implementations. The control channels may include, for example, a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. In some implementations, the CCCH is used for UEs having no RRC connection with the network. The DCCH is a point-to-point bi-directional channel that transmits dedicated control information between a UE and the network. In some implementations, the DCCH is used by UEs having an RRC connection.

Traffic channels are used for the transfer of user plane information only, according to some implementations. The traffic channels include, for example, a dedicated traffic channel (DTCH). The DTCH is a point-to-point channel, dedicated to one UE, for the transfer of user information. In some implementations, the DTCH can exist in both UL and DL.

In some scenarios, mappings may be implemented between the logical channels and transport channels. For example, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. As another example, in UL, CCCH can be mapped to UL-SCH, DCCH can be mapped to UL-SCH, and DTCH can be mapped to UL-SCH.

Figure 5:
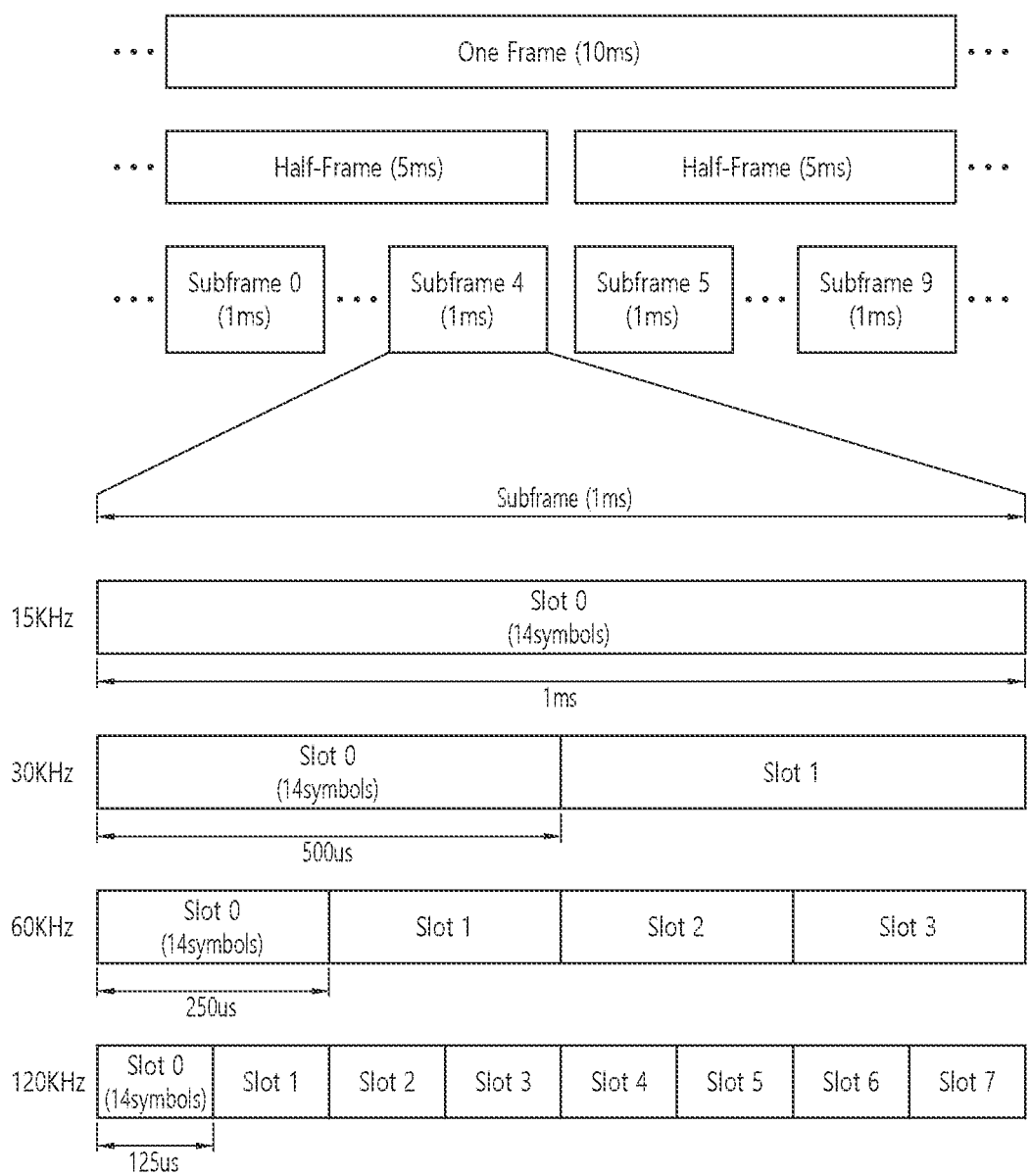
FIG. 5 shows a frame structure in a 3GPP based wireless communication system to which implementations of the present disclosure can be applied.

FIG. 5 shows a frame structure in a 3GPP based wireless communication system to which implementations of the present disclosure can be applied.

The frame structure shown in FIG. 5 is purely exemplary and the number of subframes, the number of slots, and/or the number of symbols in a frame may be variously changed. In the 3GPP based wireless communication system, OFDM numerologies (e.g., subcarrier spacing (SCS), TTI duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 5, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^{u}*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, number of slots per frame $N^{frame,u}_{slot}$, and the number of slots per subframe $N^{subframe,u}_{slot}$ for the extended CP, according to the subcarrier spacing $\Delta f=2^{u}*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{slot}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 6:
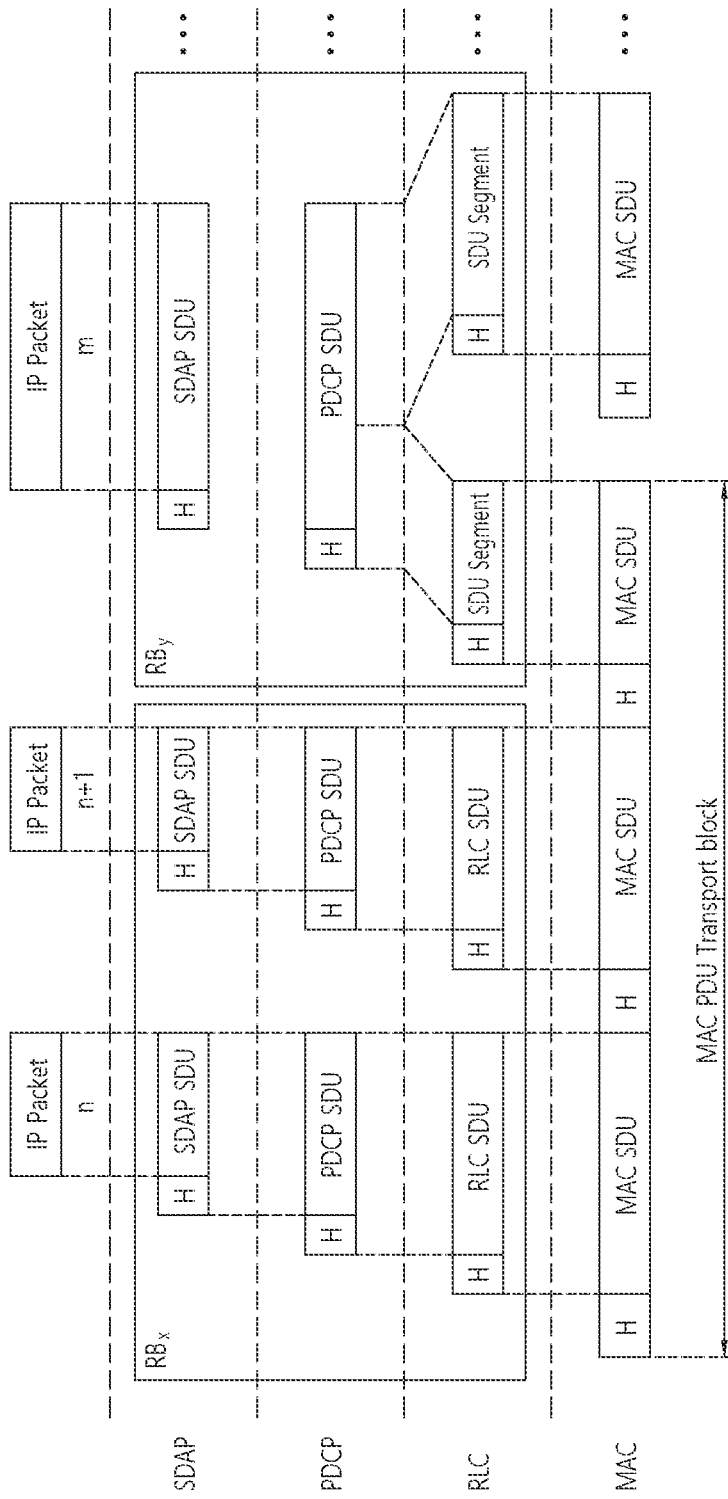
FIG. 6 shows a data flow example in the 3GPP NR system to which implementations of the present disclosure can be applied.

FIG. 6 shows a data flow example in the 3GPP NR system to which implementations of the present disclosure can be applied.

Referring to FIG. 6, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

Figure 7:
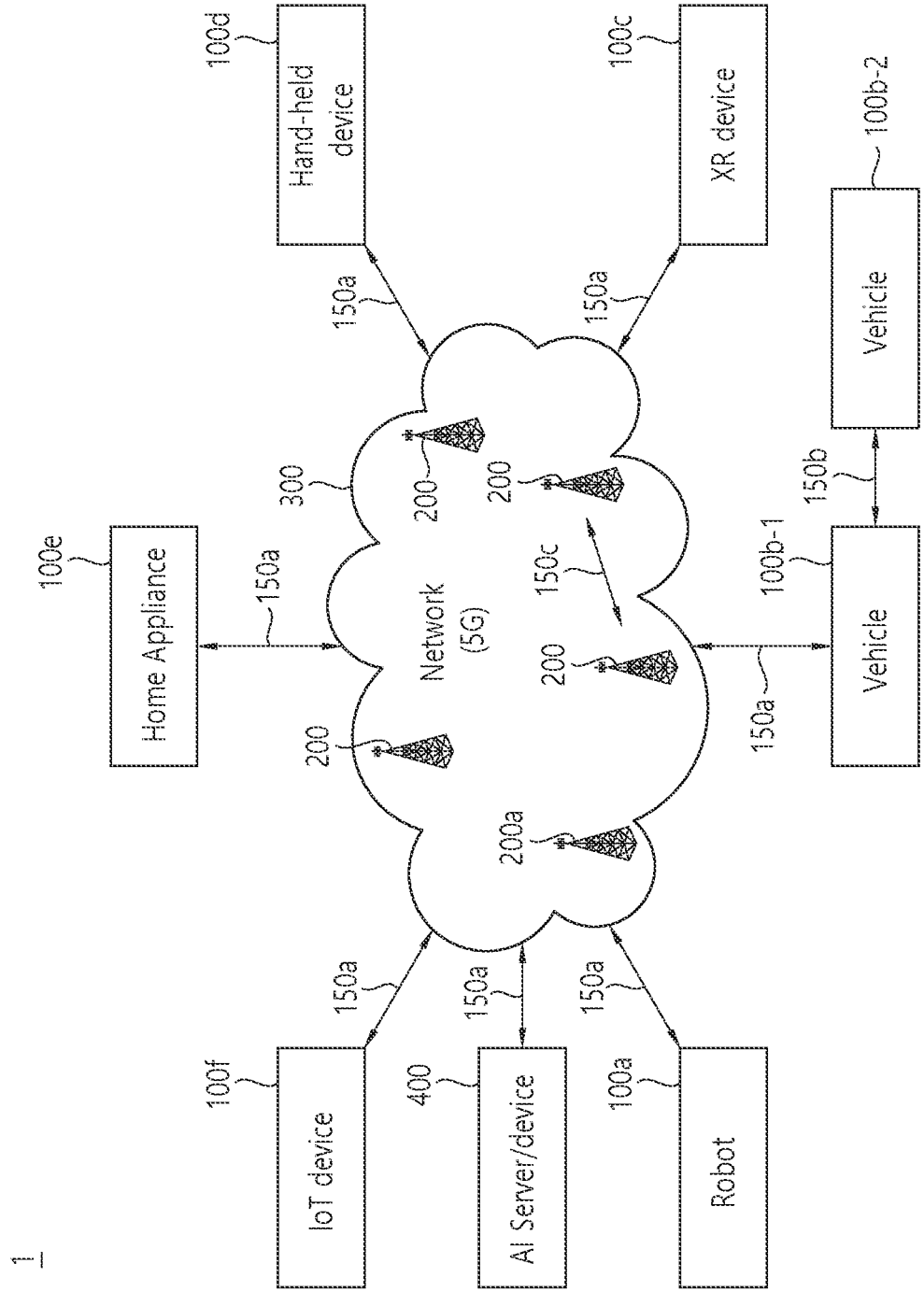
FIG. 7 shows an example of a communication system to which implementations of the present disclosure is applied.

FIG. 7 shows an example of a communication system to which implementations of the present disclosure is applied.

The 5G usage scenarios shown in FIG. 7 are only exemplary, and the technical features of the present disclosure can be applied to other 5G usage scenarios which are not shown in FIG. 7.

Three main requirement categories for 5G include (1) a category of enhanced mobile broadband (eMBB), (2) a category of massive machine type communication (mMTC), and (3) a category of ultra-reliable and low latency communications (URLLC).

Referring to FIG. 7, the communication system 1 includes wireless devices 100a to 100f, base stations (BSs) 200, and a network 300. Although FIG. 7 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smart-glasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a. 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 8:
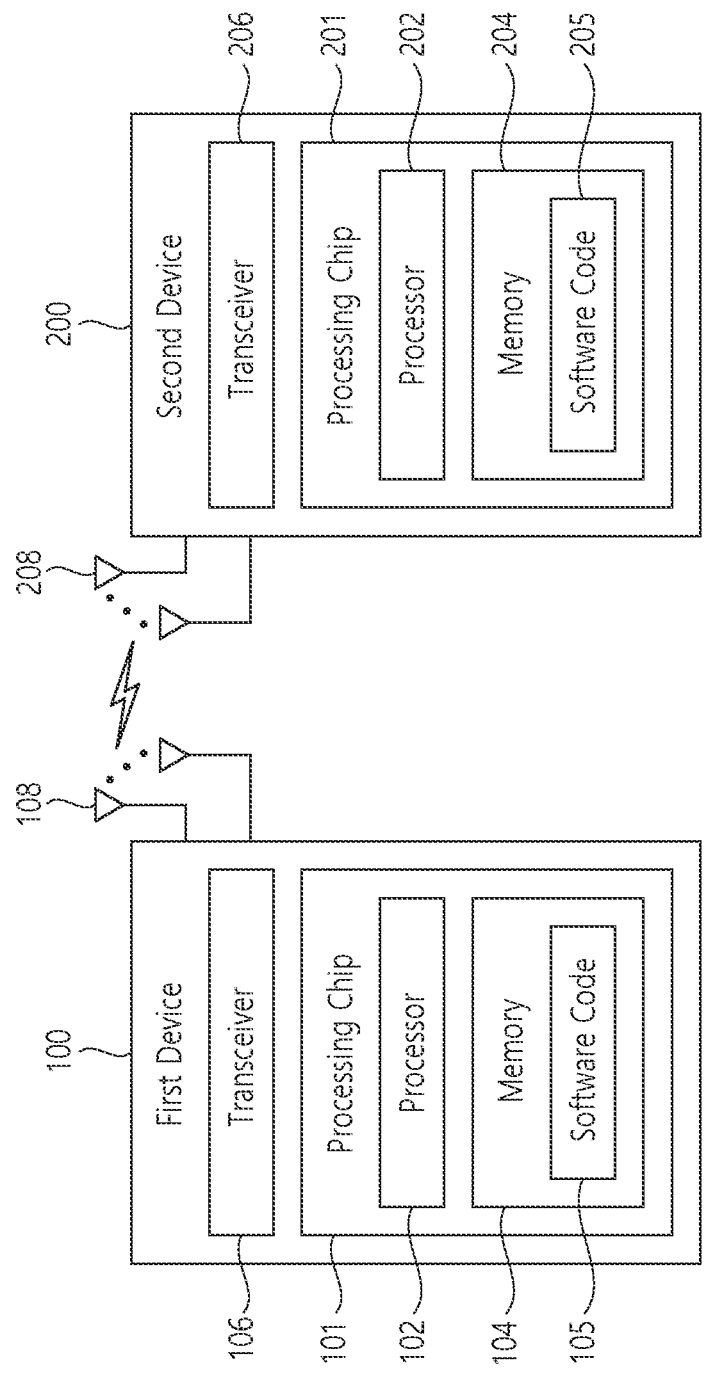
FIG. 8 shows an example of wireless devices to which implementations of the present disclosure is applied.

FIG. 8 shows an example of wireless devices to which implementations of the present disclosure is applied.

Referring to FIG. 8, a first wireless device 100 and a second wireless device 200 may transmit/receive radio signals to/from an external device through a variety of RATs (e.g., LTE and NR).

In FIG. 8, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 8.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 8 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 8 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 9:
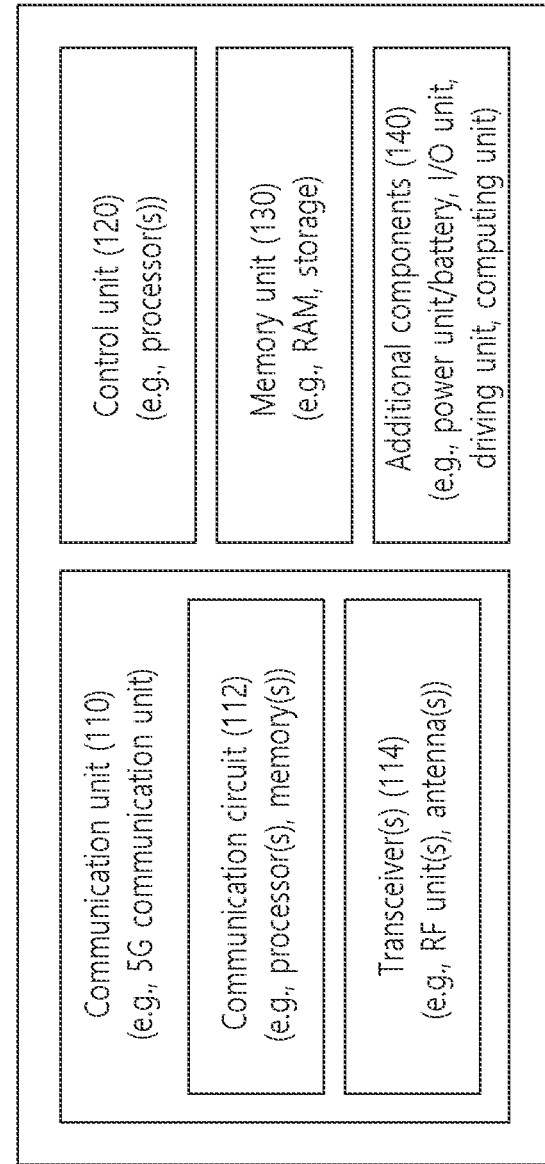
FIG. 9 shows an example of a wireless device to which implementations of the present disclosure is applied.

FIG. 9 shows an example of a wireless device to which implementations of the present disclosure is applied.

The wireless device may be implemented in various forms according to a use-case/service (refer to FIG. 7).

Referring to FIG. 9, wireless devices 100 and 200 may correspond to the wireless devices 100 and 200 of FIG. 8 and may be configured by various elements, components, units/ portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 8 and/or the one or more memories 104 and 204 of FIG. 8. For example, the transceiver(s) 114 may include the one or more transceivers 106 and 206 of FIG. 8 and/or the one or more antennas 108 and 208 of FIG. 8. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 7), the vehicles (100b-1 and 100b-2 of FIG. 7), the XR device (100c of FIG. 7), the hand-held device (100d of FIG. 7), the home appliance (100e of FIG. 7), the IoT device (100f of FIG. 7), a digital broadcast terminal, a hologram device, a public safety device, an MTC device, a medicine device, a FinTech device (or a finance device), a security device, a climate/environment device, the AI server/device (400 of FIG. 7), the BSs (200 of FIG. 7), a network node, etc. The wireless devices 100 and 200 may be used in a mobile or fixed place according to a use-example/service.

In FIG. 9, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 10:
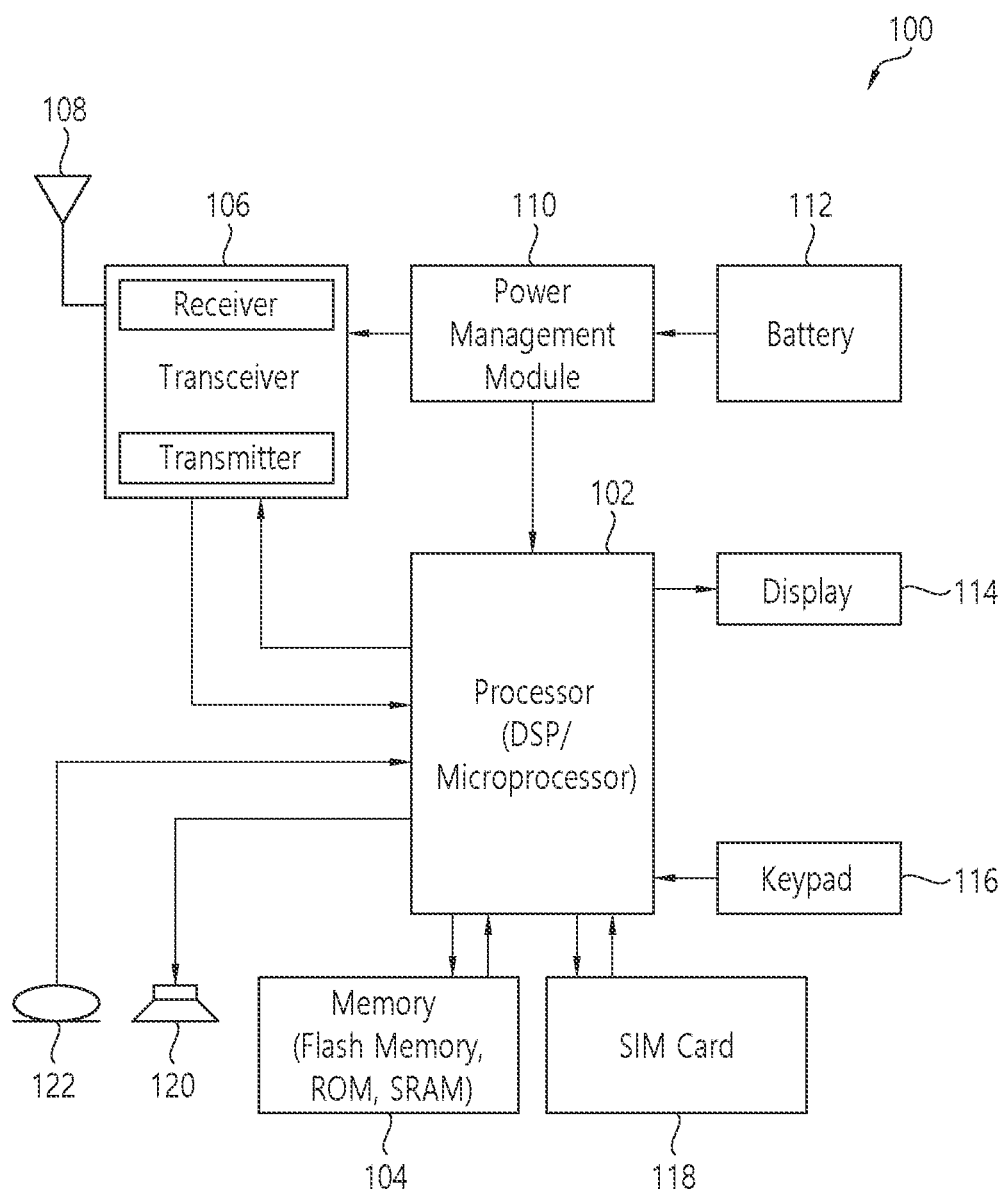
FIG. 10 shows an example of UE to which implementations of the present disclosure is applied.

FIG. 10 shows an example of UE to which implementations of the present disclosure is applied.

Referring to FIG. 10, a UE 100 may correspond to the first wireless device 100 of FIG. 8 and/or the wireless device 100 or 200 of FIG. 9.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

1. Implementation 1

If MAC reset for Uu interface occurs, the UE may reset a new data indicator (NDI) to 0 for all UL HARQ processes. Therefore, if the base station sends downlink control information including NDI set to 1 via PDCCH after MAC reset, the corresponding UL HARQ process in the UE may stop transmitting the existing TB and create and transmit a new TB.

Meanwhile, when sidelink resource allocation mode 1 (i.e., scheduled resource allocation) is configured, the TX UE may receive PDCCH addressed to SL-RNTI and acquire sidelink resources via PDCCH. The TX UE may decide whether to apply/use sidelink resources to new transmission or retransmission only, depending on whether the NDI indicated by the PDCCH is toggled or not for the HARQ process ID indicated by the PDCCH. Unlike the UL process, a specific HARQ process ID may always not be fixed to a specific sidelink process. A specific HARQ process ID may be assigned to a specific sidelink process only when new transmission is applied. Therefore, if MAC reset for Uu interface occurs, a problem may occur that NDI cannot be reset (i.e., set to 0) on a sidelink process basis.

According to implementation 1 of the present disclosure, upon receiving PDCCH including sidelink grant and NDI toggled for a specific HARQ Process ID, the wireless device may assign the specific HARQ process ID to a specific sidelink process. The wireless device may perform a first HARQ transmission of a TB in the specific sidelink process by using the sidelink grant.

According to implementation 1 of the present disclosure, if MAC reset occurs for the interface between UE and the base station, NDI indicated by the PDCCH may set to 0 for all HARQ process IDs for sidelink. Upon receiving PDCCH including NDI set to 0 for the HARQ process ID, the wireless device may perform HARQ retransmission of the TB in the specific sidelink process by using the sidelink grant. Upon receiving PDCCH including NDI set to 1 for the HARQ process ID, the wireless device may perform a first HARQ transmission of a new TB in the specific sidelink process and/or in another sidelink process by using the sidelink grant.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 11:
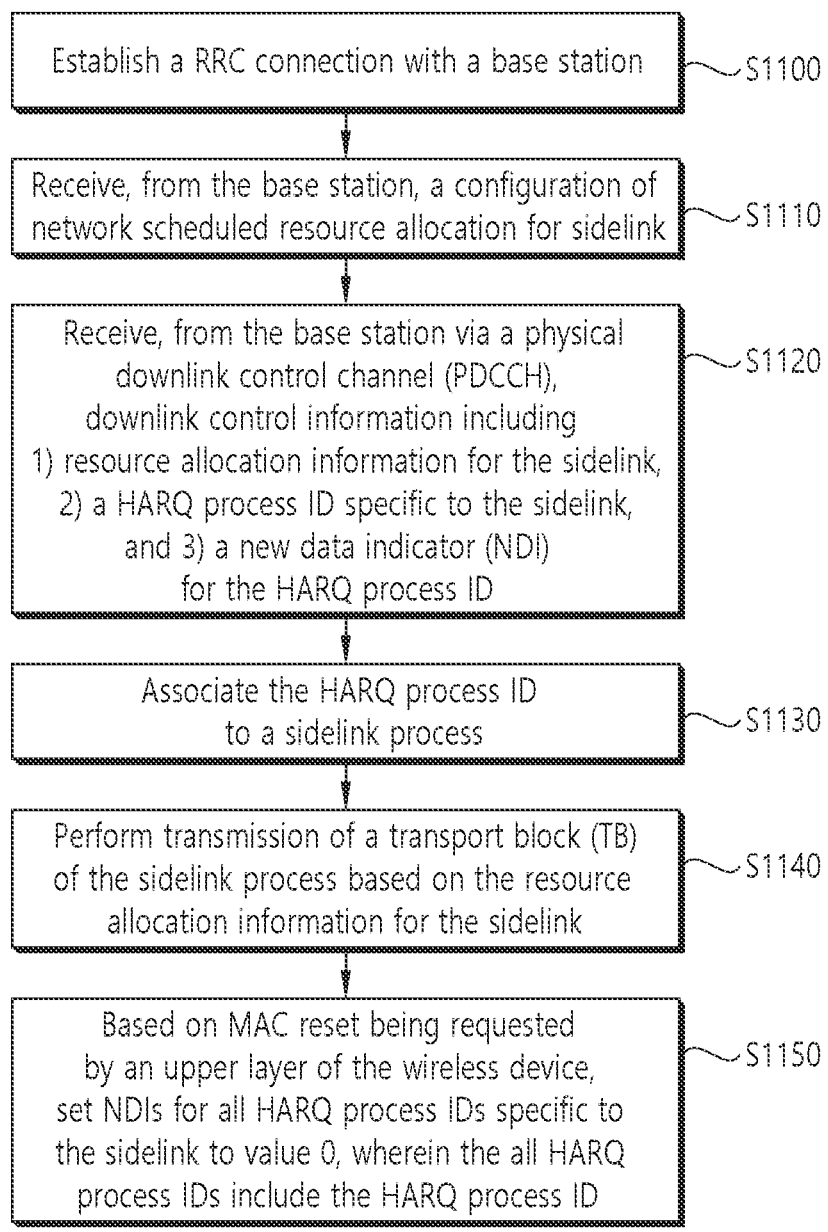
FIG. 11 shows an example of a method performed by a wireless device to which implementation of the present disclosure is applied.

FIG. 11 shows an example of a method performed by a wireless device to which implementation of the present disclosure is applied.

In step S1100, the method includes establishing a RRC connection with a base station.

In step S1110, the method includes receiving, from the base station, a configuration of network scheduled resource allocation for sidelink. That is, the sidelink resource allocation mode 1 is configured.

In step S1120, the method includes receiving, from the base station via a PDCCH, downlink control information including 1) resource allocation information for the sidelink, 2) a HARQ process ID specific to the sidelink, and 3) a NDI for the HARQ process ID.

In some implementations, the PDCCH may be addressed to a SL-RNTI and/or SLCS-RNTI.

In some implementations, the resource allocation information for the sidelink may correspond to a sidelink grant.

In step S1130, the method includes associating the HARQ process ID to a sidelink process.

For example, a delivered sidelink grant and its associated Sidelink transmission information are associated with a Sidelink process. Each Sidelink process supports one TB.

For each sidelink grant, the Sidelink HARQ Entity may:

1> if the MAC entity determines that the sidelink grant is used for initial transmission; and 1> if no MAC PDU has been obtained:

2> associate a Sidelink process to this grant, and for each associated Sidelink process:

3> obtain the MAC PDU to transmit from the Multiplexing and assembly entity, if any;

3> if a MAC PDU to transmit has been obtained:

4> if the sidelink grant was received on PDCCH for SL-RNTI or SLCS-RNTI or if the sidelink grant corresponds to either configured grant Type 1 or configured grant Type 2:

5> associate the HARQ Process ID corresponding to the sidelink grant to the associated Sidelink process.

4> determines Sidelink transmission information of the TB for the source and destination pair of the MAC PDU as follows:

5> set the Source Layer-1 ID to the 16 MSB of the Source Layer-2 ID of the MAC PDU;

5> set the Destination Layer-1 ID to the 8 MSB of the Destination Layer-2 ID of the MAC PDU;

5> consider the NDI to have been toggled and set the NDI to the toggled value;

5> associate the Sidelink process to a Sidelink process ID:

5> enable HARQ feedback, if sl-HARQ-FeedbackEnabled has been set to Enabled for the logical channel(s) in the MAC PDU, and, if enabled for groupcast, selects either negative-only acknowledgement or positive-negative acknowledgement;

5> set the priority to the value of the highest priority of the logical channel(s) and a MAC CE, if any, if included, in the MAC PDU;

5> if HARQ feedback is enabled for groupcast and UE's location information is available:

6> set the communication range to the value of the longest communication range of the logical channel(s) in the MAC PDU, if configured;

6> set the location information to the Zone_id determined, if configured and UE's location information is available:

4> deliver the MAC PDU, the sidelink grant and the Sidelink transmission information of the TB to the associated Sidelink process;

4> instruct the associated Sidelink process to trigger a new transmission;

1> else (i.e. retransmission):

2> if the HARQ Process ID corresponding to the sidelink grant received on PDCCH is associated to a Sidelink process of which HARQ buffer is empty; or 2> if the HARQ Process ID corresponding to the sidelink grant received on PDCCH is not associated to any Sidelink process:

3> ignore the sidelink grant.

2> else:

3> identify the Sidelink process associated with this grant, and for each associated Sidelink process:

4> if s-MaxTransNum corresponding to the highest priority of the logical channel(s) in the MAC PDU has been configured in sl-CG-MaxTransNumList for the sidelink grant by RRC and the maximum number of transmissions of the MAC PDU has been reached to sl-MaxTransNum; or 4> if a positive acknowledgement to a transmission of the MAC PDU has been received; or 4> if only a negative acknowledgement was enabled in the SCI and no negative acknowledgement was received for the most recent (re-)transmission of the MAC PDU:

5> flush the HARQ buffer of the associated Sidelink process:

5> stop the configuredGrantTimer, if running.

4> else:

5> deliver the sidelink grant of the MAC PDU to the associated Sidelink process;

5> instruct the associated Sidelink process to trigger a retransmission.

In step S1140, the method includes performing transmission of a TB of the sidelink process based on the resource allocation information for the sidelink.

For example, the Sidelink process is associated with a HARQ buffer.

New transmissions and retransmissions are performed on the resource indicated in the sidelink grant and with the MCS selected.

If the sidelink process is configured to perform transmissions of multiple MAC PDUs the process maintains a counter SL_RESOURCE_RESELECTION_COUNTER. For other configurations of the sidelink process, this counter is not available.

When cg-RetransmissionTimer is configured and the Sidelink HARQ entity obtains a MAC PDU to transmit, the corresponding Sidelink process is considered to be pending. A pending Sidelink process is pending until a transmission is performed on that Sidelink process or until the Sidelink process is flushed.

If the Sidelink HARQ Entity requests a new transmission, the Sidelink process shall.

1> store the MAC PDU in the associated HARQ buffer:

1> store the sidelink grant received from the Sidelink HARQ Entity:

1> generate a transmission as described below;

If the Sidelink HARQ Entity requests a retransmission, the Sidelink process shall:

1> generate a transmission as described below;

To generate a transmission, the Sidelink process shall:

1> if there is no uplink transmission; or

1> if the MAC entity is able to simultaneously perform uplink transmission(s) and sidelink transmission at the time of the transmission; or 1> if the other MAC entity and the MAC entity are able to simultaneously perform uplink transmission(s) and sidelink transmission at the time of the transmission respectively; or 1> if there is a MAC PDU to be transmitted for this duration in uplink, except a MAC PDU obtained from the Msg3 buffer or prioritized, and the sidelink transmission is prioritized over uplink transmission:

2> instruct the physical layer to transmit SCI according to the stored sidelink grant with the associated Sidelink transmission information:

2> instruct the physical layer to generate a transmission according to the stored sidelink grant;

2> if sl-HARQ-FeedbackEnabled has been set to enabled for the logical channel(s) in the MAC PDU:

3> instructs the physical layer to monitor PSFCH for the transmission.

In step S1150, the method includes, based on a MAC reset being requested by an upper layer of the wireless device, setting NDIs for all HARQ process IDs specific to the sidelink to value 0. The all HARQ process IDs include the HARQ process ID.

In some implementations, the MAC reset may be requested based on a procedure including at least one of a system information (SI) request procedure, an RRC establishment procedure, an RRC reconfiguration with Sync procedure, an RRC release procedure and/or an RRC re-establishment procedure.

In some implementations, after the MAC reset, the method may further include receiving, from the base station, a second DCI next to the DCI for the HARQ process ID. The second DCI may include 1) second resource allocation information for the sidelink, 2) the HARQ process ID specific to the sidelink, and 3) a NDI set to value 1 for the HARQ process ID, re-associating the HARQ process ID to a second sidelink process, and performing transmission of a second TB of the second sidelink process based on the second resource allocation information for the sidelink.

In some implementations, after the MAC reset, the method may further include receiving, from the base station, a second DCI next to the DCI for the HARQ process ID. The second DCI may include 1) second resource allocation information for the sidelink, 2) the HARQ process ID specific to the sidelink, and 3) a NDI set to value 0 for the HARQ process ID, and performing retransmission of the TB of the sidelink process based on the second resource allocation information for the sidelink.

In some implementations, a PC5 unicast link and/or a PC5-RRC connection for the sidelink may be established between the wireless device and a second wireless device.

In some implementations, the TB may be for sidelink data from logical channels.

In some implementations, the wireless device may be in communication with at least one of a mobile device, a network, and/or autonomous vehicles other than the wireless device.

For example, if a reset of the MAC entity is requested by upper layers, the MAC entity shall:

1> initialize Bj for each logical channel to zero;

1> stop (if running) all timers;

1> consider all timeAlignmentTimers as expired;

1> set the NDIs for all uplink HARQ processes to the value 0:

1> set the NDIs for all HARQ process IDs to the value 0 to receive the PDCCH for the MAC entity's SL-RNTI and SLCS-RNTI;

1> stop, if any, ongoing RACH procedure;

1> discard explicitly signalled contention-free Random Access Resources, if any;

1> flush Msg3 buffer:

1> cancel, if any, triggered Scheduling Request procedure:

1> cancel, if any, triggered Buffer Status Reporting procedure:

1> cancel, if any, triggered Power Headroom Reporting procedure;

1> cancel, if any, triggered Sidelink Buffer Status Reporting procedure;

1> cancel, if any, triggered configured sidelink grant confirmation:

1> flush the soft buffers for all DL HARQ processes;

1> for each DL HARQ process, consider the next received transmission for a TB as the very first transmission;

1> release, if any, Temporary C-RNTI;

1> reset BFI_COUNTER.

For another example, if a reset of the MAC entity is requested by upper layers, the MAC entity shall:
1> initialize Bj for each logical channel to zero:
1> initialize SBj for each logical channel to zero if Sidelink resource allocation mode 1 is configured by RRC;
1> stop (if running) all timers;
1> consider all timeAlignmentTimers as expired;
1> set the NDIs for all uplink HARQ processes to the value 0:
1> sets the NDIs for all HARQ process IDs to the value 0 for monitoring PDCCH in Sidelink resource allocation mode 1:
1> stop, if any, ongoing Random Access procedure:
1> discard explicitly signalled contention-free Random Access Resources for 4-step RA type and 2-step RA type, if any:
1> flush Msg3 buffer:
1> flush MSGA buffer;
1> cancel, if any, triggered Scheduling Request procedure:
1> cancel, if any, triggered Buffer Status Reporting procedure;
1> cancel, if any, triggered Power Headroom Reporting procedure:
1> cancel, if any, triggered consistent LBT failure:
1> cancel, if any, triggered BFR;
1> cancel, if any, triggered Sidelink Buffer Status Reporting procedure;
1> cancel, if any, triggered Pre-emptive Buffer Status Reporting procedure:
1> cancel, if any, triggered Recommended bit rate query procedure;
1> cancel, if any, triggered Configured uplink grant confirmation;
1> cancel, if any, triggered configured sidelink grant confirmation;
1> cancel, if any, triggered Desired Guard Symbol query;
1> flush the soft buffers for all DL HARQ processes:
1> for each DL HARQ process, consider the next received transmission for a TB as the very first transmission:
1> release, if any, Temporary C-RNTI;
1> reset all BFI_COUNTERs;
1> reset all LBT_COUNTERs.

Furthermore, the method in perspective of the wireless device described above in FIG. 11 may be performed by the first wireless device 100 shown in FIG. 8, the wireless device 100 shown in FIG. 9, and/or the UE 100 shown in FIG. 10.

More specifically, the wireless device comprises at least one transceiver, at least one processor, and at least one computer memory operably connectable to the at least one processor and storing instructions that, based on being executed by the at least one processor, perform operations below.

The wireless device establishes a RRC connection with a base station.

The wireless device receives, from the base station, a configuration of network scheduled resource allocation for sidelink. That is, the sidelink resource allocation mode 1 is configured.

The wireless device receives, from the base station via a PDCCH, downlink control information including 1) resource allocation information for the sidelink, 2) a HARQ process ID specific to the sidelink, and 3) a NDI for the HARQ process ID.

In some implementations, the PDCCH may be addressed to a SL-RNTI and/or SLCS-RNTI.

In some implementations, the resource allocation information for the sidelink may correspond to a sidelink grant.

The wireless device associates the HARQ process ID to a sidelink process.

The wireless device performs transmission of a TB of the sidelink process based on the resource allocation information for the sidelink.

The wireless device, based on a MAC reset being requested by an upper layer of the wireless device, sets NDIs for all HARQ process IDs specific to the sidelink to value 0. The all HARQ process IDs include the HARQ process ID.

In some implementations, the MAC reset may be requested based on a procedure including at least one of a system information (SI) request procedure, an RRC establishment procedure, an RRC reconfiguration with Sync procedure, an RRC release procedure and/or an RRC re-establishment procedure.

In some implementations, after the MAC reset, the method may further include receiving, from the base station, a second DCI next to the DCI for the HARQ process ID. The second DCI may include 1) second resource allocation information for the sidelink, 2) the HARQ process ID specific to the sidelink, and 3) a NDI set to value 1 for the HARQ process ID, re-associating the HARQ process ID to a second sidelink process, and performing transmission of a second TB of the second sidelink process based on the second resource allocation information for the sidelink.

In some implementations, after the MAC reset, the method may further include receiving, from the base station, a second DCI next to the DCI for the HARQ process ID. The second DCI may include 1) second resource allocation information for the sidelink, 2) the HARQ process ID specific to the sidelink, and 3) a NDI set to value 0 for the HARQ process ID, and performing retransmission of the TB of the sidelink process based on the second resource allocation information for the sidelink.

In some implementations, a PC5 unicast link and/or a PC5-RRC connection for the sidelink may be established between the wireless device and a second wireless device.

In some implementations, the TB may be for sidelink data from logical channels.

Furthermore, the method in perspective of the wireless device described above in FIG. 11 may be performed by control of the processor 102 included in the first wireless device 100 shown in FIG. 8, by control of the communication unit 110 and/or the control unit 120 included in the wireless device 100 shown in FIG. 9, and/or by control of the processor 102 included in the UE 100 shown in FIG. 10.

More specifically, an apparatus operating in a wireless communication system (e.g., wireless device) comprises at least one processor, and at least one computer memory operably connectable to the at least one processor. The at least one processor is configured to perform operations comprising: obtaining downlink control information including 1) resource allocation information for sidelink, 2) a HARQ process ID specific to the sidelink, and 3) a NDI for the HARQ process ID, associating the HARQ process ID to a sidelink process, and based on a MAC reset being requested by an upper layer, setting NDIs for all HARQ process IDs specific to the sidelink to value 0, wherein the all HARQ process IDs include the HARQ process ID.

Furthermore, the method in perspective of the wireless device described above in FIG. 11 may be performed by a software code 105 stored in the memory 104 included in the first wireless device 100 shown in FIG. 8.

The technical features of the present disclosure may be embodied directly in hardware, in a software executed by a processor, or in a combination of the two. For example, a method performed by a wireless device in a wireless communication may be implemented in hardware, software, firmware, or any combination thereof. For example, a software may reside in RAM, flash memory, ROM, EPROM, EEPROM, registers, hard disk, a removable disk, a CD-ROM, or any other storage medium.

Some example of storage medium may be coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include RAM such as synchronous dynamic random access memory (SDRAM), ROM, non-volatile random access memory (NVRAM). EEPROM, flash memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some implementations of the present disclosure, a non-transitory computer-readable medium (CRM) has stored thereon a plurality of instructions.

More specifically, at least one CRM stores instructions that, based on being executed by at least one processor, perform operations comprising: obtaining downlink control information including 1) resource allocation information for sidelink, 2) a HARQ process ID specific to the sidelink, and 3) a NDI for the HARQ process ID, associating the HARQ process ID to a sidelink process, and based on a MAC reset being requested by an upper layer, setting NDIs for all HARQ process IDs specific to the sidelink to value 0, wherein the all HARQ process IDs include the HARQ process ID.

Figure 12:
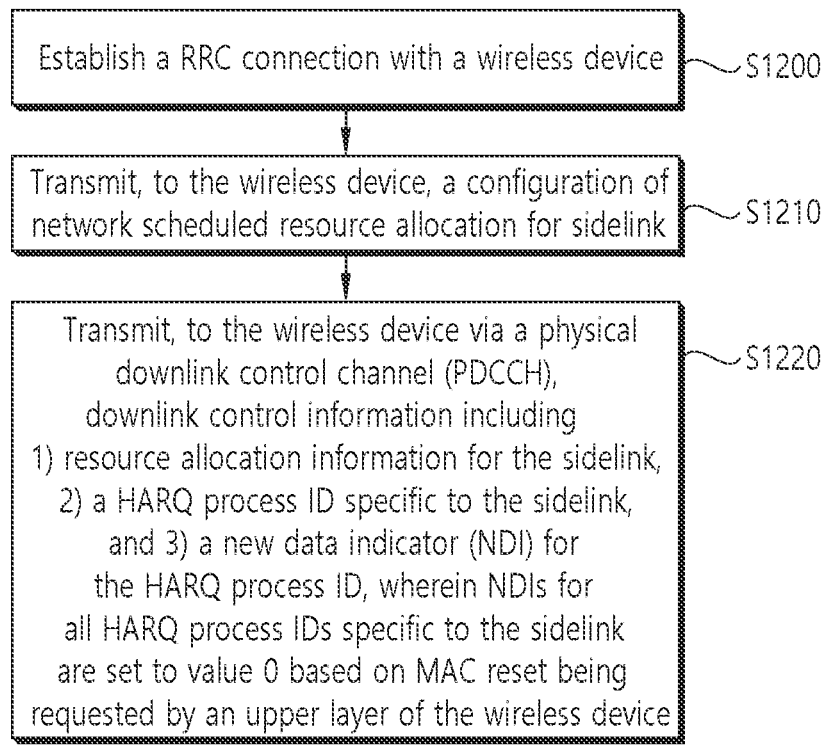
FIG. 12 shows an example of a method performed by a network node to which implementation of the present disclosure is applied.

FIG. 12 shows an example of a method performed by a network node to which implementation of the present disclosure is applied.

In step S1200, the method includes establishing a RRC connection with a wireless device.

In step S1210, the method includes transmitting, to the wireless device, a configuration of network scheduled resource allocation for sidelink.

In step S1220, the method includes transmitting, to the wireless device via a PDCCH, downlink control information including 1) resource allocation information for the sidelink, 2) a HARQ process ID specific to the sidelink, and 3) a NDI for the HARQ process ID.

NDIs for all HARQ process IDs specific to the sidelink are set to value 0 based on MAC reset being requested by an upper layer of the wireless device.

In some implementations, the MAC reset may be requested based on a procedure including at least one of a SI request procedure, an RRC establishment procedure, an RRC reconfiguration with Sync procedure, an RRC release procedure and/or an RRC re-establishment procedure.

In some implementations, after the MAC reset, the method may further include transmitting, to the wireless device, a second DCI next to the DCI for the HARQ process ID. The second DCI may include 1) second resource allocation information for the sidelink, 2) the HARQ process ID specific to the sidelink, and 3) a NDI set to value 1 for the HARQ process ID.

In some implementations, after the MAC reset, the method may further include transmitting, to the wireless device, a second DCI next to the DCI for the HARQ process ID. The second DCI may include 1) second resource allocation information for the sidelink, 2) the HARQ process ID specific to the sidelink, and 3) a NDI set to value 0 for the HARQ process ID.

Furthermore, the method in perspective of the network node described above in FIG. 12 may be performed by the second wireless device 200 shown in FIG. 8 and/or the wireless device 200 shown in FIG. 9.

More specifically, the network node comprises at least one transceiver, at least one processor, and at least one computer memory operably connectable to the at least one processor and storing instructions that, based on being executed by the at least one processor, perform operations below.

The network node establishes a RRC connection with a wireless device.

The network node transmits, to the wireless device, a configuration of network scheduled resource allocation for sidelink.

The network node transmits, to the wireless device via a PDCCH, downlink control information including 1) resource allocation information for the sidelink, 2) a HARQ process ID specific to the sidelink, and 3) a NDI for the HARQ process ID.

NDIs for all HARQ process IDs specific to the sidelink are set to value 0 based on MAC reset being requested by an upper layer of the wireless device.

In some implementations, the MAC reset may be requested based on a procedure including at least one of a SI request procedure, an RRC establishment procedure, an RRC reconfiguration with Sync procedure, an RRC release procedure and/or an RRC re-establishment procedure.

In some implementations, after the MAC reset, the network node may transmit, to the wireless device, a second DCI next to the DCI for the HARQ process ID. The second DCI may include 1) second resource allocation information for the sidelink, 2) the HARQ process ID specific to the sidelink, and 3) a NDI set to value 1 for the HARQ process ID.

In some implementations, after the MAC reset, the network node may transmit, to the wireless device, a second DCI next to the DCI for the HARQ process ID. The second DCI may include 1) second resource allocation information for the sidelink, 2) the HARQ process ID specific to the sidelink, and 3) a NDI set to value 0 for the HARQ process ID.

According to implementation 1 of the present disclosure, in case of Uu MAC reset, NDI can be reset only for the HARQ process ID indicated by PDCCH. Therefore, after Uu MAC reset, if the base station transmits DCI including NDI set to 1, the UE can optionally stop transmission of the existing TB and select sidelink process in which newly created TB is to be transmitted.

2. Implementation 2

A UE may reset MAC for Uu RRC connection (i.e., RRC connection between UE and BS) in various cases as follows.

For example, upon request for on demand system information, if cell reselection occurs while waiting for the acknowledgment for system information request from lower layers, the UE may reset MAC.

For example, if timer T300 expires, the UE may reset MAC, and release the MAC configuration and re-establish RLC for all RBs that are established.

For example, upon abortion of RRC connection establishment, the UE may reset MAC, and release the MAC configuration and re-establish RLC for all RBs that are established.

For example, upon T304 expiry (i.e., reconfiguration with sync failure) when RRCReconfiguration is received via other RAT (HO to NR failure), the UE may reset MAC.

For example, upon initiation of the RRC connection re-establishment procedure, the UE may reset MAC.

For example, upon RRC connection release, if the RRCRelease includes suspendConfig, the UE may reset MAC and release the default MAC Cell Group configuration, if any.

For example, upon going to RRC_IDLE, the UE may reset MAC.

For example, upon reception of the RRCReject by the UE, the UE may reset MAC and release the default MAC Cell Group configuration.

For example, upon successfully completing the handover, at the source side the UE may reset MAC.

On the other hand. MAC reset for PC5-RRC connection (i.e., RRC connection between wireless device for sidelink) has not been specified yet. Thus, how the UE handles sidelink transmission upon MAC reset is not clear.

Figure 13:
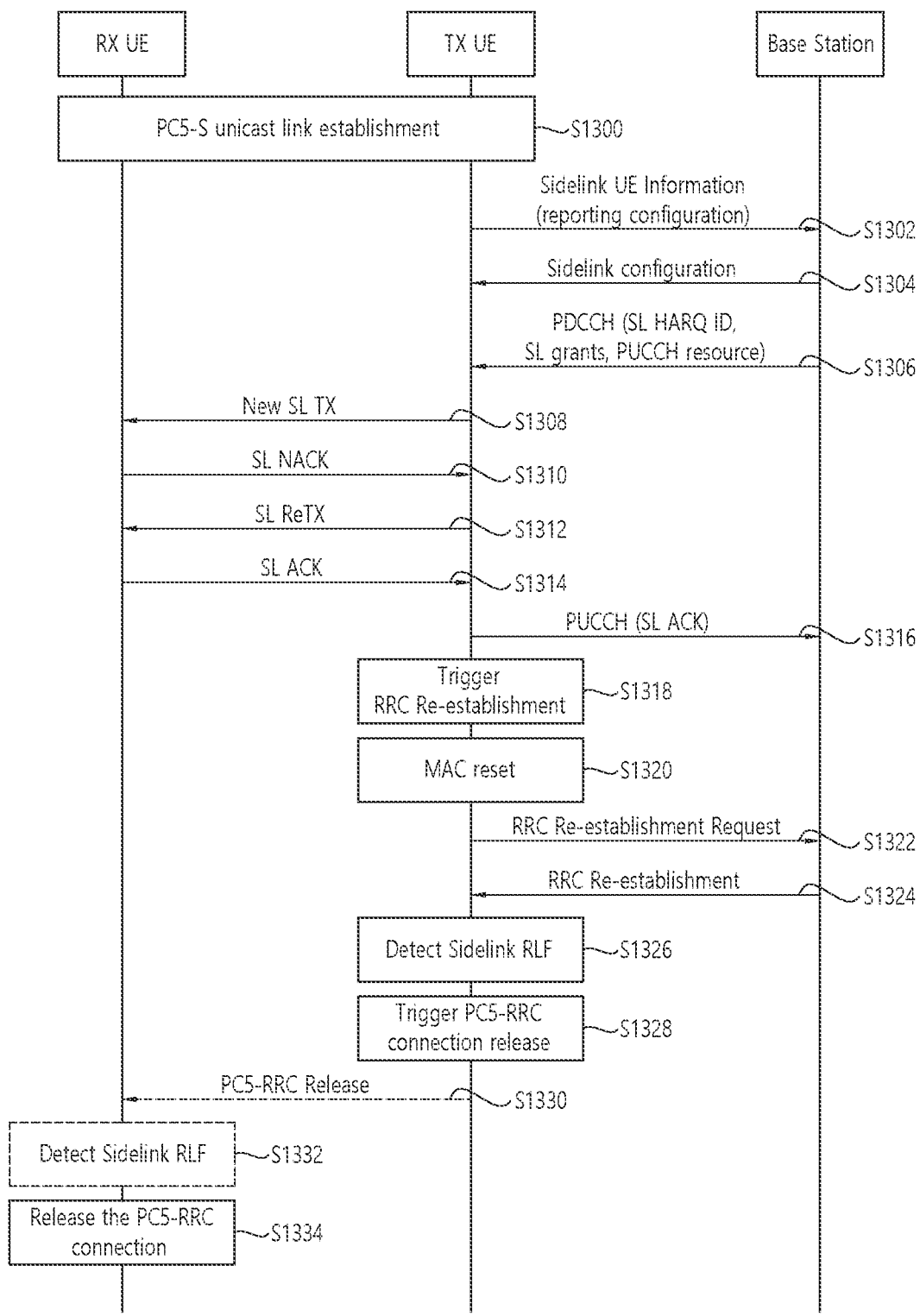
FIG. 13 shows an example of MAC reset operation to which implementation of the present disclosure is applied.

FIG. 13 shows an example of MAC reset operation to which implementation of the present disclosure is applied.

For the sake of convenience, FIG. 13 exemplarily describes MAC reset operation for sidelink data transmission. The present disclosure is not limited thereto, and may be applied to quality reporting for uplink data transmission as well.

In step S1300, the TX UE establishes a PC5-S unicast link and the associated PC5-RRC connection with the RX UE.

In some implementations, the TX UE may transmit a PC5-S signaling over SCCH to establish a PC5 unicast link and the associated PC5-RRC connection.

In step S1302, the TX UE sends Sidelink UE information indicating the destination ID of the RX UE to the network.

In step S1304, the TX UE is configured with sidelink transmissions and receptions for the PC5-RRC connection.

In step S1306, upon establishment of the PC5 unicast link and the PC5-RRC connection, the TX UE receives PDCCH indicating SL grant with a new data indicator (NDI) and a HARQ process ID.

In some implementations, the PDCCH may be addressed to SL-RNTI or SLCS-RNTI.

In some implementations, the PDCCH may indicate SL HARQ process ID, SL resource and/or PUCCH resource for SL HARQ (re-)transmissions.

In step S1308, the TX UE performs new SL transmission of a MAC PDU with the SL grant for the sidelink process associated to the HARQ process ID for the PC5-RRC connection.

In some implementations, the MAC PDU may carry SL data from one or more logical channels such as SCCH(s) and STCH(s).

In step S1310, the TX UE receives SL negative acknowledgement (NACK) for the PC5-RRC connection in response to the SL transmission of the MAC PDU.

In step S1312, the TX UE performs SL retransmission of the MAC PDU for the PC5-RRC connection.

In step S1314, the TX UE receives SL acknowledgement (ACK) for the PC5-RRC connection in response to the SL retransmission of the MAC PDU.

In step S1316, the TX UE forwards the received SL ACK to the base station by using the PUCCH resource for SL HARQ transmissions.

In some implementations, upon MAC reset triggered by Uu procedure, the TX UE may set the NDI for the HARQ process ID to the value 0 to receive the PDCCH. The Uu procedure may include at least one of SI request, RRC establishment, RRC reconfiguration with sync, RRC release and/or RRC re-establishment.

For example, in step S1318, the TX UE detects Uu RLF and triggers RRC re-establishment procedure. In step S1310, upon triggering the RRC re-establishment procedure, the TX UE performs MAC reset. If a reset of the MAC entity is requested by upper layers, the MAC entity shall:

1> initialize Bj for each logical channel to zero;
1> stop (if running) all timers:
1> consider all timeAlignmentTimers as expired;
1> set the NDIs for all uplink HARQ processes to the value 0:
1> set the NDIs for all HARQ process IDs to the value 0 to receive the PDCCH for the MAC entity's SL-RNTI and SLCS-RNTI:
1> stop, if any, ongoing RACH procedure;
1> discard explicitly signalled contention-free Random Access Resources, if any;
1> flush Msg3 buffer:
1> cancel, if any, triggered Scheduling Request procedure:
1> cancel, if any, triggered Buffer Status Reporting procedure;
1> cancel, if any, triggered Power Headroom Reporting procedure;
1> cancel, if any, triggered Sidelink Buffer Status Reporting procedure;
1> cancel, if any, triggered configured sidelink grant confirmation;
1> flush the soft buffers for all DL HARQ processes;
1> for each DL HARQ process, consider the next received transmission for a TB as the very first transmission;
1> release, if any, Temporary C-RNTI:
1> set BFI_COUNTER.
1> release PUCCH configuration for sidelink HARQ ACK.

In step S1322, the TX UE transmits a RRC re-establishment request message to the base station. In step S1324, the TX UE receives a RRC re-establishment message from the base station in response to the RRC re-establishment request message.

In some implementations, upon MAC reset triggered by PC5-RRC procedure, the TX UE initialize SBj for each logical channel associated to the PC5-RRC connection to zero, and flush SL buffer of the Sidelink processes associated to the PC5-RRC connection, and sets the NDI for the Sidelink process IDs associated to the PC5-RRC connection to the value 0. The PC5-RRC procedure may include at least one of Sidelink radio link failure (RLF), PC5 RRC reconfiguration sidelink, PC5 UE capability exchange and/or PC5 RRC release.

For example, in step S1326, the TX UE detects SL RLF. In step S1328, the TX UE triggers PC5-RRC connection release to upper layers. Or, the TX UE may detect inactivity timer expiry and trigger PC5-RRC connection release to upper layers.

In step S1330, the TX UE may send PC5-RRC release message to the RX UE.

In step S1332, the RX UE may also detect SL RLF or receive the PC5-RRC release message. Thus, in step S1334, both UEs will release the PC5-RRC connection for which UE performs partial MAC reset for the PC5-RRC connection.

If a partial reset of the MAC entity for a PC5-RRC connection (or a PC5 unicast link or a destination ID or the pair of Source/Destination IDs for the corresponding cast-type) is requested by upper layers, and/or if a PC5-RRC connection (or a PC5 unicast link or a destination ID or the pair of Source/Destination IDs for the corresponding cast-type) is established, reconfigured or released, and/or if one or both of Source ID and Destination ID for a PC5-RRC connection (or a PC5 unicast link or a destination ID or the pair of Source/Destination IDs for the corresponding cast-type) are updated, the MAC entity may:

1> initialize SBj for each logical channel associated to the PC5-RRC connection (or a PC5 unicast link or a destination ID or the pair of Source/Destination IDs for the corresponding cast-type) to zero, the logical channel being SCCH used to carry PC5-S signalling and PC5-RRC signaling;

1> stop (if running) all timers associated to the PC5-RRC connection (or a PC5 unicast link or a destination ID or the pair of Source/Destination IDs for the corresponding cast-type);

1> flush the soft buffers for all sidelink processes for all TB(s) associated to the PC5-RRC connection (or a PC5 unicast link or a destination ID or the pair of Source/Destination IDs for the corresponding cast-type):

1> cancel, if any, triggered Scheduling Request procedure only associated to logical channel(s) and/or MAC CE(s) of the PC5-RRC connection (or a PC5 unicast link or a destination ID or the pair of Source/Destination IDs for the corresponding cast-type), the MAC CE being SL CSI Reporting MAC CE:

1> cancel, if any, triggered Sidelink Buffer Status Reporting procedure only associated to logical channel(s) of the PC5-RRC connection (or a PC5 unicast link or a destination ID or the pair of Source/Destination IDs for the corresponding cast-type):

1> for each Sidelink process, consider the next received transmission for a TB as the very first transmission;

1> release, if any, any RNTI (e.g. SL-RNTI or SLCS-RNTI) only associated to SL transmission of the PC5-RRC connection (or a PC5 unicast link or a destination ID or the pair of Source/Destination IDs for the corresponding cast-type).

1> release, if any, PUCCH configuration only associated to SL transmission of the PC5-RRC connection (or a PC5 unicast link or a destination ID or the pair of Source/Destination IDs for the corresponding cast-type).

According to implementation 2 of the present disclosure, a UE performing SL transmission can properly reset MAC, in particular when UE detects link failure on Uu interface or PC5 interface.

According to implementation 2 of the present disclosure, the system can properly handle MAC reset for a UE performing SL transmission.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device configured to operate in a wireless communication system, the method comprising:
    establishing a radio resource control (RRC) connection with a base station;
    based on the wireless device being configured with a sidelink resource allocation mode 1, receiving, from the base station, a physical downlink control channel (PDCCH) based on a sidelink radio network temporary identity (SL-RNTI), wherein the PDCCH includes i) a sidelink grant, and ii) a new data indicator (NDI) for a hybrid automatic repeat request (HARQ) process identifier (ID) related to the sidelink grant;
    associating a sidelink process related to a transport block (TB) to the sidelink grant;
    associating the HARQ process ID to the sidelink process;
    performing transmission of the TB based on the sidelink grant; and
    based on a media access control (MAC) reset being requested by an upper layer of the wireless device, setting NDIs for all HARQ process IDs to value 0 for receiving a PDCCH based on the SL-RNTI,
    wherein the all HARQ process IDs include the HARQ process ID.

2. The method of claim 1, wherein the method further comprises, after the MAC reset:
    receiving, from the base station, a second PDCCH based on the SL-RNTI, wherein the second PDCCH includes i) a second sidelink grant, and ii) a NDI set to value 1 for the HARQ process ID related to the second sidelink grant;
    associating a second sidelink process related to a second TB to the second sidelink grant;
    re-associating the HARQ process ID to the second sidelink process; and
    performing transmission of the second TB the second sidelink grant.

3. The method of claim 1, wherein the method further comprises, after the MAC reset:
    receiving, from the base station, a second PDCCH based on the SL-RNTI, wherein the second PDCCH includes i) a second sidelink grant, and ii) a NDI set to value 0 for the HARQ process ID related to the second sidelink grant; and
    performing retransmission of the TB based on the second sidelink grant.

4. The method of claim 1, wherein the sidelink resource allocation mode 1 is a sidelink resource allocation mode in which sidelink resource allocation is provided by the base station.

5. The method of claim 1, wherein the MAC reset is requested based on a procedure including at least one of a system information (SI) request procedure, an RRC establishment procedure, an RRC reconfiguration with Sync procedure, an RRC release procedure and/or an RRC re-establishment procedure.

6. The method of claim 1, wherein the PDCCH further includes the HARQ process ID.

7. The method of claim 1, wherein a PC5 unicast link and/or a PC5-RRC connection is established between the wireless device and a second wireless device.

8. The method of claim 1, wherein the TB is for sidelink data from logical channels.

9. The method of claim 1, wherein the wireless device is in communication with at least one of a mobile device, a network, and/or autonomous vehicles other than the wireless device.

10. A wireless device configured to operate in a wireless communication system, the wireless device comprising:
   at least one transceiver;
   at least one processor; and
   at least one memory operably connectable to the at least one processor and storing instructions that, based on being executed by the at least one processor, perform operations comprising:
   establishing a radio resource control (RRC) connection with a base station;
   based on the wireless device being configured with a sidelink resource allocation mode 1, receiving, from the base station via the at least one transceiver, a physical downlink control channel (PDCCH) based on a sidelink radio network temporary identity (SL-RNTI), wherein the PDCCH includes i) a sidelink grant, and ii) a new data indicator (NDI) for a hybrid automatic repeat request (HARQ) process identifier (ID) related to the sidelink grant;
   associating a sidelink process related to a transport block (TB) to the sidelink grant;
   associating the HARQ process ID to the sidelink process;
   performing, via the at least one transceiver, transmission of the TB based on the sidelink grant; and
   based on a media access control (MAC) reset being requested by an upper layer of the wireless device, setting NDIs for all HARQ process IDs to value 0 for receiving a PDCCH based on the SL-RNTI,
   wherein the all HARQ process IDs include the HARQ process ID.

11. The wireless device of claim 10, wherein the operations further comprise, after the MAC reset:
   receiving, from the base station, a second PDCCH based on the SL-RNTI, wherein the second PDCCH includes i) a second sidelink grant, and ii) a NDI set to value 1 for the HARQ process ID related to the second sidelink grant;
   associating a second sidelink process related to a second TB to the second sidelink grant;
   re-associating the HARQ process ID to the second sidelink process; and
   performing transmission of the second TB the second sidelink grant.

12. The wireless device of claim 10, wherein the operations further comprise, after the MAC reset:
   receiving, from the base station, a second PDCCH based on the SL-RNTI, wherein the second PDCCH includes i) a second sidelink grant, and ii) a NDI set to value 0 for the HARQ process ID related to the second sidelink grant; and
   performing retransmission of the TB based on the second sidelink grant.

13. The wireless device of claim 10, wherein the sidelink resource allocation mode 1 is a sidelink resource allocation mode in which sidelink resource allocation is provided by the base station.

14. The wireless device of claim 10, wherein the MAC reset is requested based on a procedure including at least one of a system information (SI) request procedure, an RRC establishment procedure, an RRC reconfiguration with Sync procedure, an RRC release procedure and/or an RRC re-establishment procedure.

15. A processing apparatus configured to control a wireless device in a wireless communication system, the processing apparatus comprising:
   at least one processor; and
   at least one memory operably connectable to the at least one processor, wherein the at least one processor is configured to perform operations comprising:
   based on the wireless device being configured with a sidelink resource allocation mode 1, obtaining, via a physical downlink control channel (PDCCH) based on a sidelink radio network temporary identity (SL-RNTI), i) a sidelink grant, and ii) a new data indicator (NDI) for a hybrid automatic repeat request (HARQ) process identifier (ID) related to the sidelink grant;
   associating a sidelink process related to a transport block (TB) to the sidelink grant;
   associating the HARQ process ID to the sidelink process; and
   based on a media access control (MAC) reset being requested by an upper layer, setting NDIs for all HARQ process IDs to value 0 for receiving a PDCCH based on the SL-RNTI,
   wherein the all HARQ process IDs include the HARQ process ID.

* * * * *